US010517281B2

(12) United States Patent
Sowinski

(10) Patent No.: US 10,517,281 B2
(45) Date of Patent: Dec. 31, 2019

(54) AQUARIUM DEVICE

(71) Applicant: Sunset Marine Labs, LLC, Signal Hill, CA (US)

(72) Inventor: Nancy Sowinski, Long Beach, CA (US)

(73) Assignee: SUNSET MARINE LABS, LLC, Signal Hill, CA (US)

( * ) Notice: Subject to any disclaimer, the term of this patent is extended or adjusted under 35 U.S.C. 154(b) by 284 days.

(21) Appl. No.: 15/006,044

(22) Filed: Jan. 25, 2016

(65) Prior Publication Data

US 2017/0208782 A1 Jul. 27, 2017

(51) Int. Cl.
*A01K 63/04* (2006.01)
*A01K 63/00* (2017.01)

(52) U.S. Cl.
CPC .......... *A01K 63/047* (2013.01); *A01K 63/003* (2013.01); *A01K 63/045* (2013.01)

(58) Field of Classification Search
CPC .... A01K 63/00; A01K 63/003; A01K 63/006; A01K 63/04; A01K 63/042; A01K 63/045; A01K 63/047
See application file for complete search history.

(56) References Cited

U.S. PATENT DOCUMENTS

| | | | | |
|---|---|---|---|---|
| 2,947,312 A | * | 8/1960 | Heinicke | A47L 15/16 134/1 |
| 4,509,545 A | * | 4/1985 | Trotter | A47J 43/24 134/199 |
| 5,782,204 A | * | 7/1998 | Rahn | A01K 63/006 119/255 |
| 6,187,194 B1 | * | 2/2001 | Byrne | A01K 63/042 210/167.25 |
| 7,610,878 B2 | | 11/2009 | Stime, Jr. | |
| 2003/0116489 A1 | * | 6/2003 | Terato | A01K 63/045 210/167.21 |
| 2004/0200427 A1 | * | 10/2004 | Dulaney | A01K 63/006 119/261 |
| 2012/0145613 A1 | * | 6/2012 | Chen | A01K 63/006 210/167.23 |
| 2012/0192798 A1 | * | 8/2012 | Kong | A01K 63/02 119/226 |
| 2012/0312244 A1 | * | 12/2012 | Sprung | A01K 63/04 119/215 |
| 2016/0229724 A1 | * | 8/2016 | Keller | C02F 1/001 |
| 2016/0235043 A1 | * | 8/2016 | Sawicki | A01K 63/045 |

* cited by examiner

*Primary Examiner* — Thanh Pham
(74) *Attorney, Agent, or Firm* — Karish & Bjorgum, PC

(57) ABSTRACT

A device for keeping jellyfish and other plankton in an aquarium having a drain and a pump, the device having a panel; a first sprayer connectable to the pump and coupled to the panel at a first position, the first sprayer having a plurality of channels or holes for generating a plurality of water streams; and a second sprayer connectable to the pump and coupled to the panel at a second position, the second sprayer having a plurality of channels or holes for generating a plurality of water streams; wherein the insert is configured so that the first sprayer and the second sprayer create a rotating current within the aquarium.

19 Claims, 4 Drawing Sheets

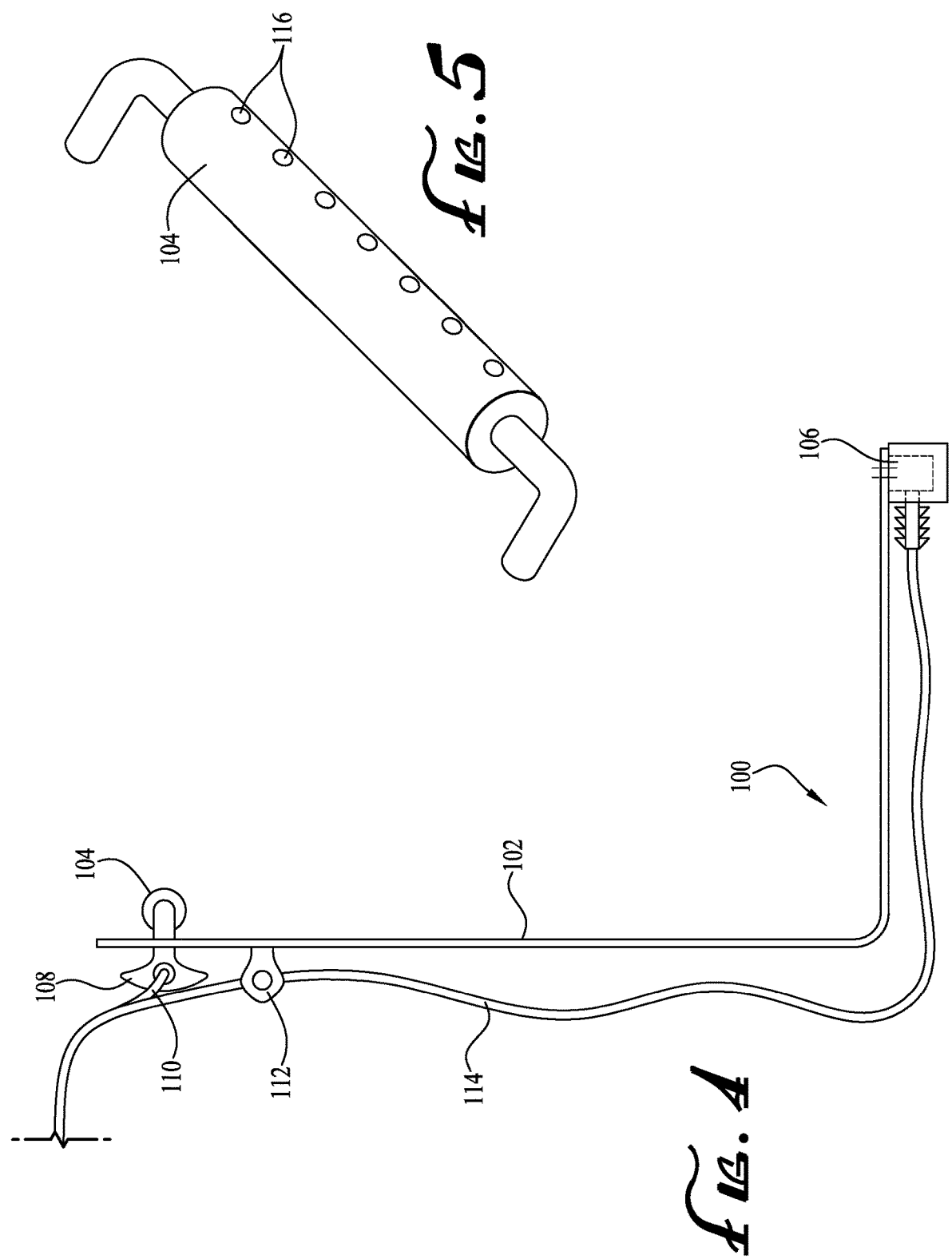

AQUARIUM DEVICE

BACKGROUND

The present invention relates to aquariums, and more particularly to aquariums suitable for keeping and displaying jellyfish.

Jellyfish and other gelatinous zooplankton require a specialized aquarium in which to live. They cannot survive in a conventional square or rectangular aquarium because conventional aquariums do not have the necessary components to create a steady or even "flow", otherwise known as a false "current" that jellyfish require in order to swim, or "bell". Without a false current, the jellyfish perish, because they sink to the bottom unable to remain suspended under their own power.

Specialized jellyfish aquariums, also known as plankton kreisels, have been around since the 1960's, when they were first used aboard research vessels to house gelatinous zooplankton during studies at sea. Water inside a traditional jellyfish aquarium rotates in a laminar fashion causing the water to spin and create a false current. Since their introduction over 40 years ago, jellyfish aquariums have continued to maintain a round or circular interior shape for the purpose of creating and maintaining the necessary false current that jellyfish depend on to survive. Additionally, traditional jellyfish aquariums require specialized components to properly create a constant "current" or "flow". Thus, traditional jellyfish aquariums require specialized materials and skill to create and maintain and are generally too expensive for standard home aquarium hobbyists. Moreover, traditional jellyfish aquariums cannot be easily converted for use with fish or other types of marine life.

Thus, there exists a need for an improved jellyfish aquarium that remedies the shortcomings of the prior art.

SUMMARY

Accordingly, the present invention is directed to a jellyfish aquarium that remedies the shortcomings of the prior art. In particular, the present invention is directed to an aquarium which may have any shape, which may be made from an existing aquarium, which is much cheaper and easier to manufacture and which may easily be converted back to a traditional aquarium.

The present invention, according to an embodiment, is directed to a device for keeping jellyfish and other plankton in an aquarium having a drain and a pump, the device comprising: a panel; a first sprayer connectable to the pump and coupled to the panel at a first position, the first sprayer further comprising a plurality of channels or holes for generating a plurality of water streams; a second sprayer connectable to the pump and coupled to the panel at a second position, the second sprayer further comprising a plurality of channels or holes for generating a plurality of water streams; wherein the device is configured so that the first sprayer and the second sprayer create a rotating current within the aquarium.

The device may also have a screen configured to be positioned proximally to the aquarium drain. In an embodiment, the first sprayer is positioned to prevent aquarium contents other than water from reaching the drain. Optionally, at least one of the first sprayer and the second sprayer is rotatably mounted to the panel. In an embodiment, a valve is coupled to at least one of the first sprayer and the second sprayer. Optionally, a first valve is coupled to the first sprayer and a second valve is coupled to the second sprayer.

In an additional embodiment, the present invention is directed to a device for keeping jellyfish and other plankton comprising: a water container; a drain for removing water from the water container; a filter coupled to the drain; at least one pump coupled to the filter; a panel removably positioned in the water container; a first sprayer connectable to the at least one pump and coupled to the panel at a first position, the first sprayer further comprising a plurality of channels or holes for generating a plurality of water streams; a second sprayer connectable to the at least one pump and coupled to the panel at a second position, the second sprayer further comprising a plurality of channels or holes for generating a plurality of water streams; wherein the insert is configured so that the first sprayer and the second sprayer create a rotating current within the water container.

Optionally, the panel further comprises a screen positioned proximally to the aquarium drain. In an embodiment, the first sprayer is positioned to prevent aquarium contents other than water from reaching the drain. Optionally, the first sprayer is rotatably mounted to the panel. A valve may be coupled to at least one of the first sprayer and the second sprayer. A first valve may be coupled to the first sprayer and a second valve coupled to the second sprayer. Optionally, a first pump is coupled to the first sprayer and a second pump is coupled to the second sprayer.

The present invention, according to yet another embodiment, is directed to a device for keeping jellyfish and other plankton comprising: a substantially rectangular water container; a filter box positioned proximal to the water container; a drain for removing water from the water container and into the filter box; a filter positioned in the filter box; at least one pump positioned in the filter box; and a return line coupled to the at least one pump for moving water from the water reservoir or filter box to the water container. A panel is removably positioned in the water container. A first sprayer is removably coupled to the return line and coupled to the panel at a first position, the first sprayer further comprises a plurality of substantially parallel, elongated channels or holes for generating a plurality of substantially parallel water streams. A second sprayer is removably coupled to the return line and coupled to the panel at a second position, the second sprayer further comprising a plurality of substantially parallel, elongated channels or holes for generating a plurality of substantially parallel water streams. The first sprayer and the second sprayer are configured to create a rotating current within the water container.

Optionally, the panel further comprises a screen positioned proximally to the aquarium drain. In an embodiment, the first sprayer is positioned to prevent aquarium contents other than water from reaching the drain. Optionally, the panel has a wall portion and a base portion substantially perpendicular to the wall portion and coupled to the wall portion; and wherein the first sprayer is positioned on the wall portion and the second sprayer is positioned on the base portion. The device may have a first adjustable valve between the first sprayer and the pump and a second adjustable valve between the second sprayer and the pump. Optionally, the pump is a variable speed pump for controlling the flow of water to the first sprayer and the second sprayer.

BRIEF DESCRIPTION OF THE DRAWINGS

The features, aspects and advantages of the present invention will become better understood with regard to the following description, appended claims and accompanying figures wherein:

FIG. 4 is a side elevation view of the insert of FIG. 3;

FIG. 5 is a perspective elevation view of sprayer according to an embodiment of the present invention usable with the insert of FIG. 3.

DETAILED DESCRIPTION

In the following description of the preferred embodiments, reference is made to the accompanying drawings which show by way of illustration specific embodiments in which the invention may be practiced. Wherever possible, the same reference numbers will be used throughout the drawings to refer to the same or like parts. It is to be understood that other embodiments may be utilized and structural and functional changes may be made without departing from the scope of the present invention.

The invention, according to an embodiment, is directed to an aquarium insert device that eliminates the need to purchase a specialized jellyfish aquarium to safely keep jellyfish. The insert according to an embodiment of the present invention may be used with a conventional square or rectangular aquarium that has a filtration system, whether it be a canister filter, built in wet/dry filter or hang on the back filter. By inserting the invention into a conventional aquarium, the conventional aquarium may be used to safely keep jellyfish. If at any time a user wishes to stop keeping jellyfish and go back to keeping fish or other marine life, the insert is easily removed and the aquarium is once again a conventional aquarium. The insert of the present invention reduces the cost for users to start keeping jellyfish while, at the same time, allowing users the flexibility and option to convert back to a conventional aquarium at any time.

Figure 1:
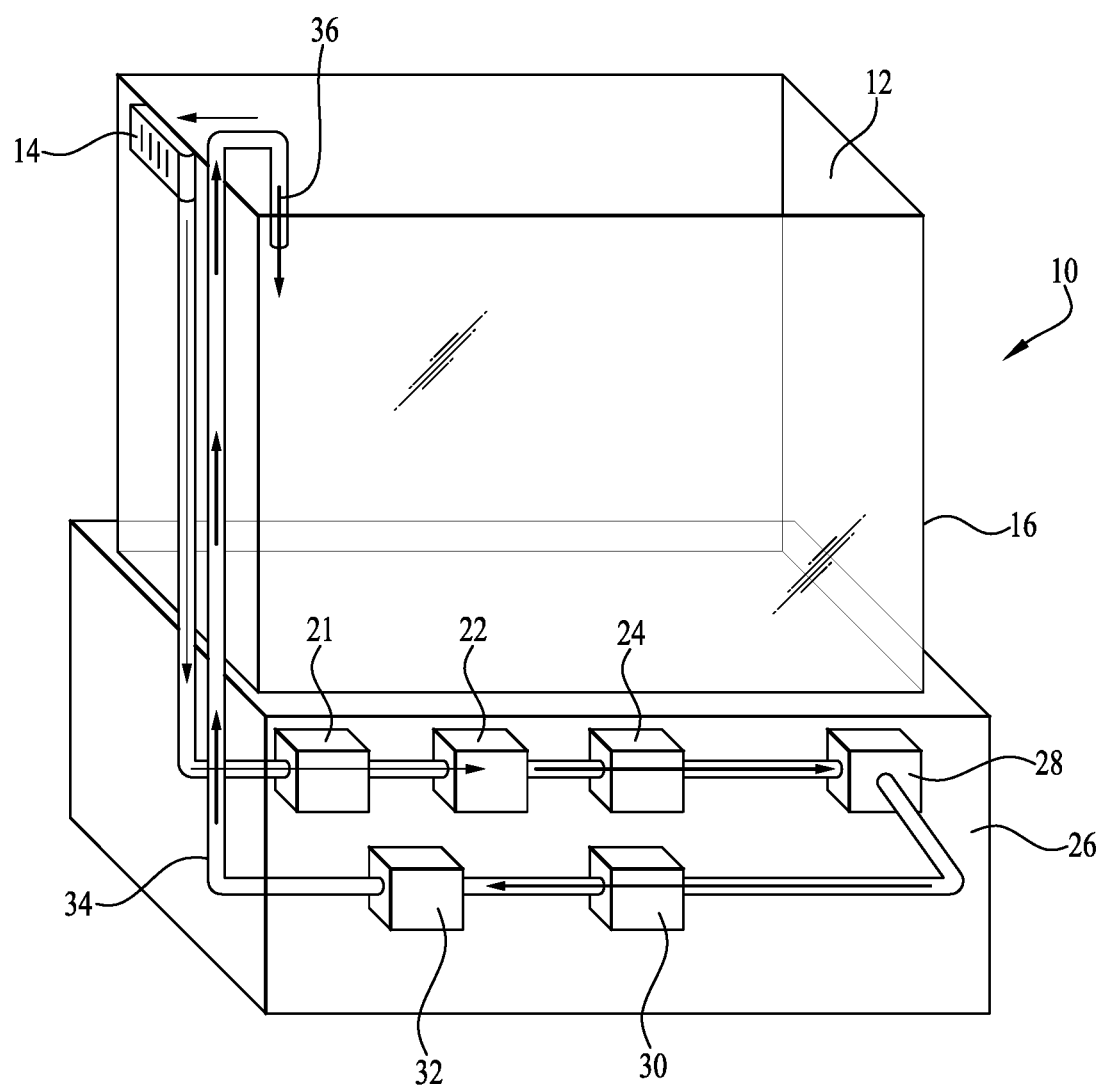
FIG. 1 is a perspective elevation view of a prior art aquarium.
Figure 2:
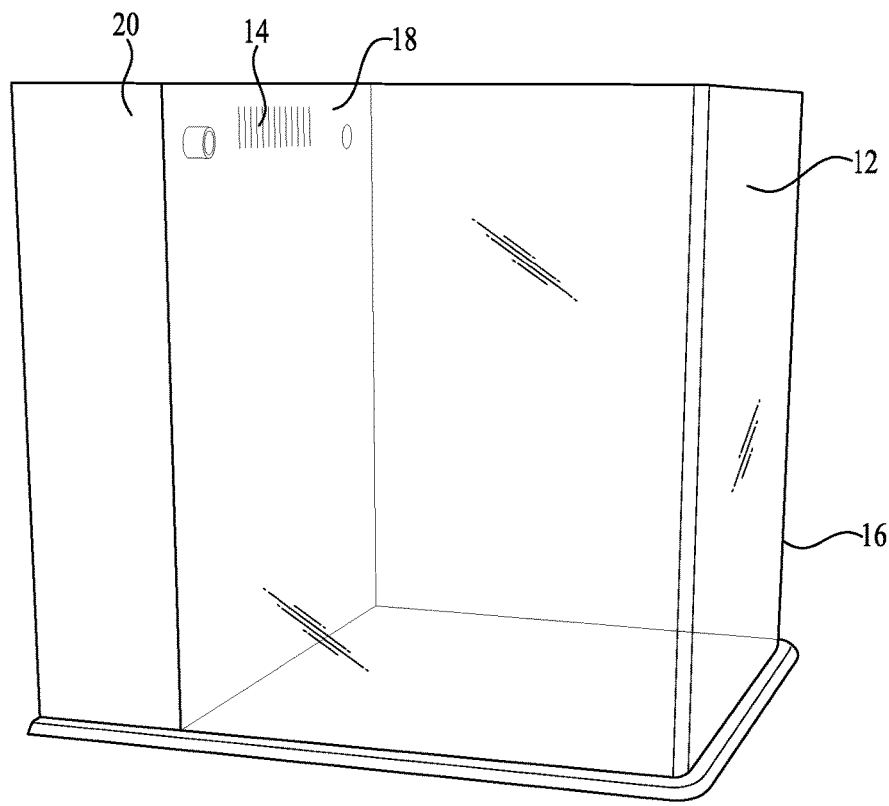
FIG. 2 is a perspective elevation view of a prior art aquarium having a filter box.
Figure 3:
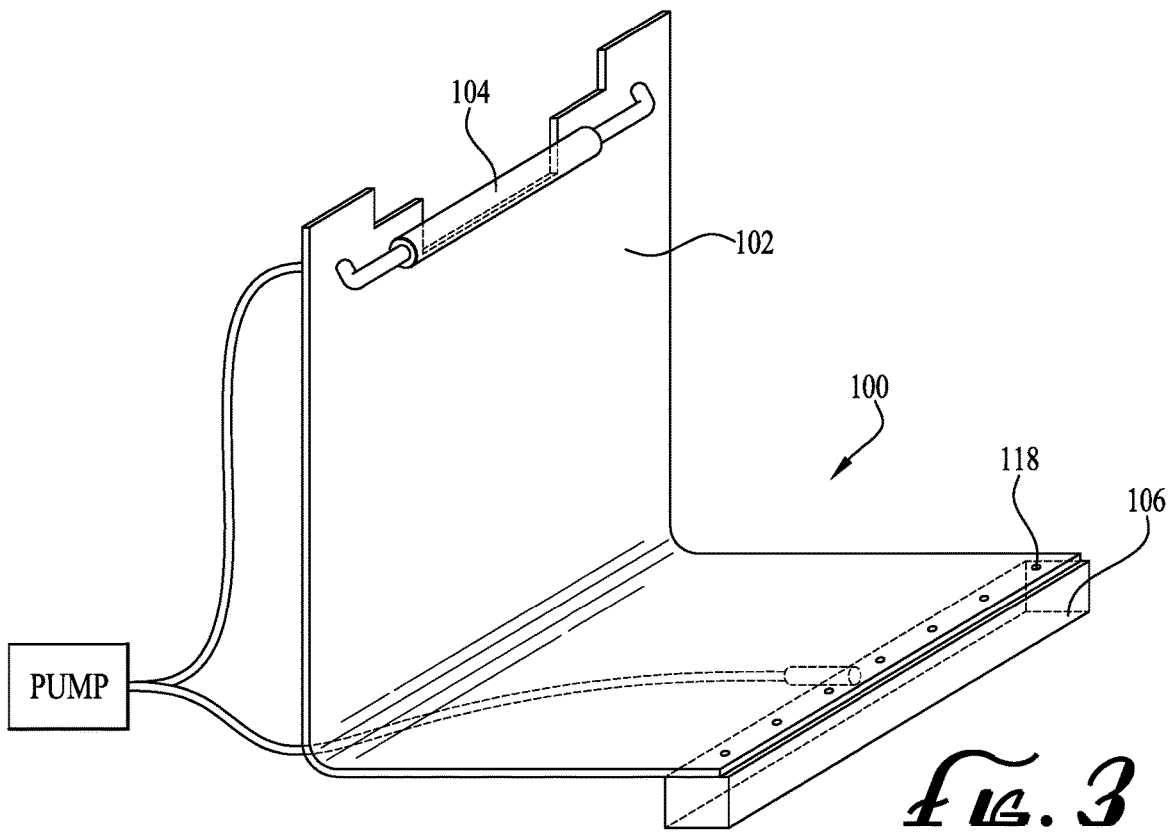
FIG. 3 is a perspective elevation view of an insert according to an embodiment of the present invention.

As shown in FIGS. 1 and 2, a conventional rectangular or square aquarium 10 has a water container 12 and a drain 14 allowing for water to drain from the water container. Typically, the water container 12 has transparent walls 16 to allow viewing of the aquarium contents. As shown in FIG. 2, the aquarium may have at least one opaque wall 18 for concealing infrastructure associated with the tank. For example, the opaque wall 18 may conceal a filter box 20.

As shown in FIG. 1, the aquarium 10 may contain a water reservoir 21, water pump 22, and a water filter 24. The pump 22 may pump water from the water reservoir 21, through the water filter 24 and back to the water container 12. The water pump 22 and water filter 24 may be positioned outside of the water container, such as, for example, within a stand 26 upon which the aquarium sits as shown in FIG. 1 or within the filter box 20 as shown in FIG. 2. Optionally, the aquarium has at least one of a refrigeration unit 28, a heater 30 and a protein skimmer 32 for conditioning the water in the aquarium.

In an embodiment of the present invention, the aquarium is configured so that water drains through the drain 14 into the filter box 20 via gravity as shown in FIG. 2. The filter box 20 contains a reservoir (not shown). Water from the reservoir is then pumped by the pump 22 through the filter 24 and through a return 34 to an inlet 36 in the water container 12. Optionally, the aquarium has more than one pump. Optionally, the aquarium has more than one filter. The aquarium may made from, for example, glass or plastic materials, such as plexi-glass, acrylic, polyvinyl chloride (PVC) or vinyl along with silicon or silicon rubber. Although shown as rectangular for purposes of illustration, aquariums may have any number of shapes, including, for example, square, hexagon or cylindrical shapes.

A plankton insert 100 according to an embodiment of the present invention is shown in FIGS. 3 to 6. As shown in FIGS. 3 to 6, the insert 100 has a panel 102 with a first sprayer 104 and a second sprayer 106. The first sprayer 104 is connected to a first valve 108 and a first tubing 110. The second sprayer 106 is connected to a second valve 112 and a second tubing 114. As explained below, the first sprayer 104 and the second sprayer 106 are positioned on the panel 102 and oriented to create a current within an aquarium water container. At least one of the first sprayer 104 and the second sprayer 106 may be a spray bar.

In an embodiment, the panel 102 is L shaped for insertion into a rectangular shaped aquarium. The panel 102 may be configured to fit inside of the aquarium such that the one portion of the panel fits against and substantially covers at least one aquarium wall 16 and a portion of the panel fits along and substantially covers a bottom of the aquarium. In alternative embodiments, the panel 102 is shaped to correspond to non-rectangular tank shapes. In an embodiment, the panel 102 is made of plastic, PVC, vinyl, silicon, silicon rubber, plexi-glass, acrylic, or Teflon. In an additional embodiment, the panel 102 is made of glass. The panel 102 may be translucent or opaque. Additionally, the panel 102 may be colored, such as to match the color of one or more aquarium walls.

In an embodiment of the present invention, the first sprayer 104 is connectable to the return 34 by the first tubing 110 and the second sprayer 106 is connectable to the return 34 by the second tubing 114. The first sprayer 104 and the second sprayer 106 have channels 116, 118, holes, or slits, for generating water streams. By controlling the direction and force of the water streams, the first sprayer and the second sprayer generate a current within the aquarium. In an embodiment, the first sprayer 104 and the second sprayer 106 each have several elongated and substantially parallel channels or holes.

The size and spacing of the channels 116, 118 may be varied depending on, for example, the size of the aquarium and the type of jellyfish or other plankton to be placed in the aquarium. In a preferred embodiment, the channels or holes are between about 1 and about 5 mm in diameter, and more preferably between about 2 and about 4 mm in diameter. In a preferred embodiment, the channels are spaced apart from about ½ inch to about 2½ inches from each other, and more preferably from about 1 inch to about 2 inches from each other. In an additional embodiment, at least one of the first sprayer 104 and the second sprayer 106 have a continuous opening configured to generate a current in the aquarium.

In an embodiment, the first sprayer 104 is rotatably coupled to the panel 102 so that a user can adjust the orientation of the water streams from the first sprayer. In an alternative embodiment, the first sprayer 104 is fixedly coupled to the panel 102 so that the direction of the water streams is predetermined. In an embodiment, the second sprayer 106 is rotatably coupled to the panel 102 so that a user can adjust the orientation of the water streams from the second sprayer. In an alternative embodiment, the second sprayer 106 is fixedly coupled to the panel 102 so that the direction of the water streams is predetermined.

Figure 6:
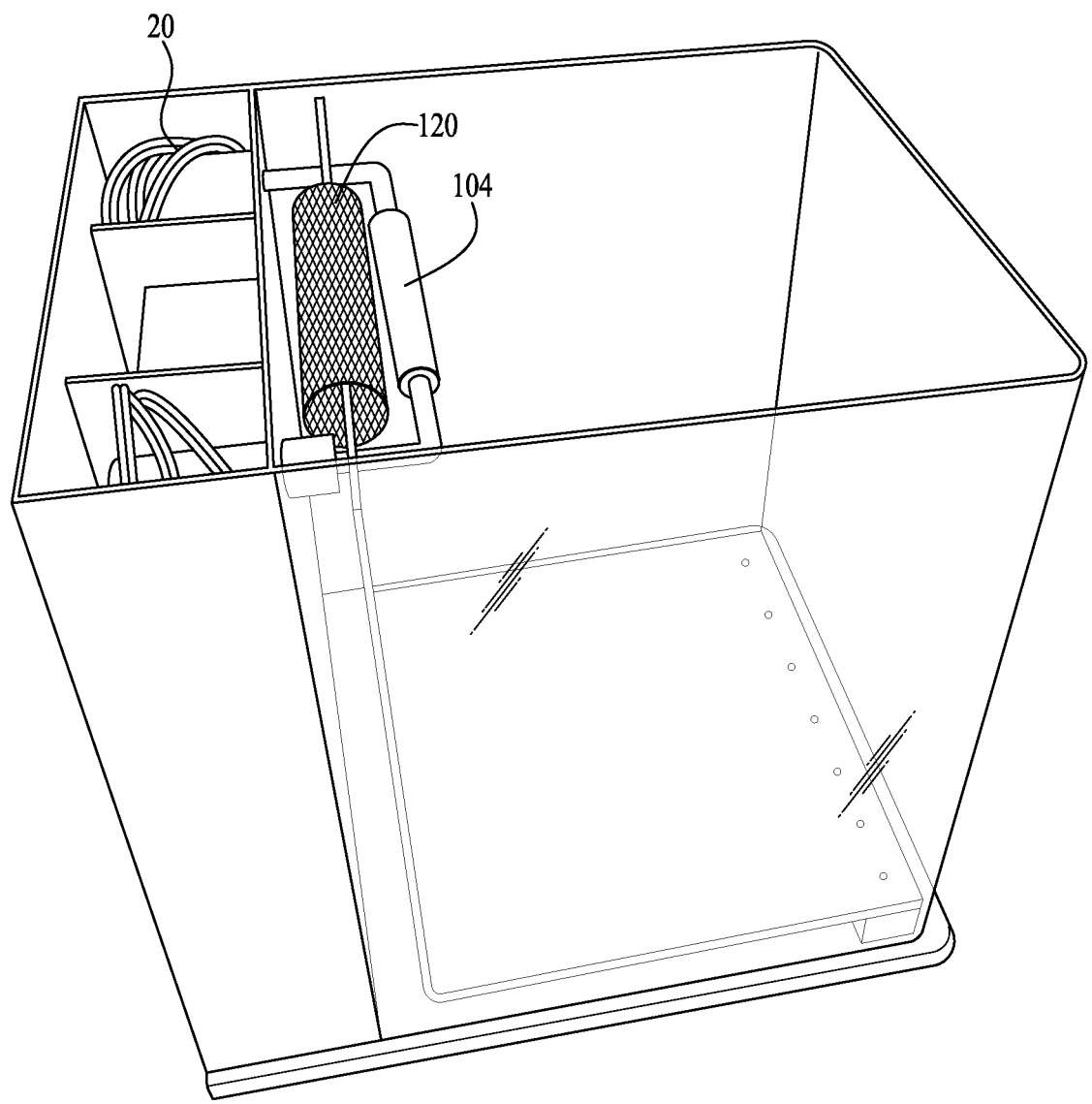
FIG. 6 is a perspective elevation view of an insert according to an embodiment of the present invention inserted into the aquarium in FIG. 2.

As shown in FIG. 6, the insert 100 may also have a screen 120 for covering the aquarium drain 14. The screen 120 may be comprised of plastic, glass, silicon, vinyl, PVC, rubber or Teflon. In an embodiment, the screen 120 has holes or openings from about 1 mm to about 15 mm wide. Preferably, the insert 100 is configured so that the first sprayer 104 is adjustably positioned close to the drain 14 to move jellyfish away from the drain. The first valve 108 allows a user to adjust how much water exits the first sprayer 104 and how much force is thereby exerted on the jellyfish. In an embodiment, the second sprayer 106 is positioned at a distal end of the panel 102 from the first sprayer 104 so that the spray from the first sprayer and the second sprayer introduce a current into the aquarium sufficient to support jellyfish or other plankton.

In an additional embodiment of the present invention, the first tubing 110 and the second tubing 114 are joined together in a junction and then a single tube is coupled to the return. Additionally, a single valve may be positioned upstream of the junction to control the flow to both the first sprayer 104 and the second sprayer 106. In an additional embodiment, the insert is coupled to a variable flow pump that may be adjusted by a user. The use of a variable flow pump may eliminate the need for one or more of the first valve 108 and the second valve 112. In an additional embodiment, a first pump is connected to the first tubing 110 and a second pump is connected to the second tubing 114.

There is disclosed in the above description and the drawings, an imaging system that fully and effectively overcomes the disadvantages associated with the prior art. However, it will be apparent that variations and modifications of the disclosed embodiments may be made without departing from the principles of the invention. The presentation of the preferred embodiments herein is offered by way of example only and not limitation, with a true scope and spirit of the invention being indicated by the following claims.

Any element in a claim that does not explicitly state "means" for performing a specified function or "step" for performing a specified function, should not be interpreted as a "means" or "step" clause as specified in 35 U.S.C. § 112.

What is claimed is:

1. A device for keeping jellyfish and other plankton in an aquarium having a drain and a pump, the device comprising:
    a substantially L-shaped panel positionable inside the aquarium;
    a first sprayer connectable to the pump and coupled to the panel at a first end position, the first sprayer further comprising a plurality of channels or holes for generating a plurality of water streams; and
    a second sprayer connectable to the pump and coupled to the panel at a second opposite end position substantially perpendicular to the first position, the second sprayer further comprising a plurality of channels or holes for generating a plurality of water streams in an upward direction;
    wherein the device is configured so that the first sprayer and the second sprayer create a rotating current within the aquarium sufficient to support jellyfish or other plankton and to move the jellyfish or other plankton away from the drain.

2. The device of claim 1 further comprising a screen configured to be positioned proximally to the aquarium drain.

3. The device of claim 2 wherein the first sprayer is positioned to prevent aquarium contents other than water from reaching the drain.

4. The device of claim 3 wherein at least one of the first sprayer and the second sprayer is rotatably mounted to the panel.

5. The device of claim 1 further comprising a valve coupled to at least one of the first sprayer and the second sprayer.

6. The device of claim 1 further comprising a first valve coupled to the first sprayer and a second valve coupled to the second sprayer.

7. A device for keeping jellyfish and other plankton comprising:
    a water container;
    a drain for removing water from the water container;
    a filter coupled to the drain;
    at least one pump coupled to the filter;
    a substantially L-shaped panel removably positioned in the water container;
    a first sprayer connectable to the at least one pump and coupled to the panel at a first end position, the first sprayer further comprising a plurality of channels or holes for generating a plurality of water streams;
    a second sprayer connectable to the at least one pump and coupled to the panel at a second opposite end position substantially perpendicular to the first position, the second sprayer further comprising a plurality of channels or holes for generating a plurality of water streams in an upward direction;
    wherein the first sprayer and the second sprayer are configured to create a rotating current within the water container sufficient to support jellyfish or other plankton and to move the jellyfish or other plankton away from the drain.

8. The device of claim 7 wherein the panel further comprises a screen positioned proximally to the aquarium drain.

9. The device of claim 8 wherein the first sprayer is positioned to prevent aquarium contents other than water from reaching the drain.

10. The device of claim 9 wherein the first sprayer is rotatably mounted to the panel.

11. The device of claim 7 further comprising a valve coupled to at least one of the first sprayer and the second sprayer.

12. The device of claim 7 further comprising a first valve coupled to the first sprayer and a second valve coupled to the second sprayer.

13. The device of claim 7 further comprising a first pump coupled to the first sprayer and a second pump coupled to the second sprayer.

14. A device for keeping jellyfish and other plankton comprising:
    a substantially rectangular water container;
    a filter box positioned proximal to the water container;
    a drain for removing water from the water container and into the filter box;
    a filter positioned in the filter box;
    at least one pump positioned in the filter box;
    a return line coupled to the at least one pump for moving water from the filter box to the water container;
    a substantially L-shaped panel removably positioned in the water container;
    a first sprayer removably coupled to the return line and coupled to the panel at a first end position, the first sprayer further comprising a plurality of substantially parallel, elongated channels for generating a plurality of substantially parallel water streams;

a second sprayer removably coupled to the return line and coupled to the panel at a second opposite end position substantially perpendicular to the first position, the second sprayer further comprising a plurality of substantially parallel, elongated channels or holes for generating a plurality of substantially parallel water streams in an upward direction;

wherein the first sprayer and the second sprayer are configured to create a rotating current within the water container sufficient to support jellyfish or other plankton and to move the jellyfish or other plankton away from the drain.

15. The device of claim 14 wherein the panel further comprises a screen positioned proximally to the aquarium drain.

16. The device of claim 15 wherein the first sprayer is positioned to prevent aquarium contents other than water from reaching the drain.

17. The device of claim 14 wherein the panel has a wall portion and a base portion substantially perpendicular to the wall portion and coupled to the wall portion; and wherein the first sprayer is positioned on the wall portion and the second sprayer is positioned on the base portion.

18. The device of 14 further comprising a first adjustable valve between the first sprayer and the pump and a second adjustable valve between the second sprayer and the pump.

19. The device of claim 14 wherein the pump is a variable speed pump for controlling the flow of water from the first sprayer and the second sprayer.

* * * * *